US008460734B2

(12) United States Patent
Sakata et al.

(10) Patent No.: US 8,460,734 B2
(45) Date of Patent: Jun. 11, 2013

(54) METHOD OF MODIFYING GUM ARABIC, MODIFIED GUM ARABIC OBTAINED BY THE METHOD, AND USE THEREOF

(75) Inventors: Makoto Sakata, Toyonaka (JP); Tsuyoshi Katayama, Toyonaka (JP); Takeshi Ogasawara, Toyonaka (JP); Yasushi Sasaki, Toyonaka (JP)

(73) Assignee: San-EI Gen F.F.I., Inc., Toyonaka-Shi (JP)

( * ) Notice: Subject to any disclaimer, the term of this patent is extended or adjusted under 35 U.S.C. 154(b) by 894 days.

(21) Appl. No.: 10/593,347

(22) PCT Filed: Mar. 24, 2005

(86) PCT No.: PCT/JP2005/005373
§ 371 (c)(1),
(2), (4) Date: Jan. 10, 2008

(87) PCT Pub. No.: WO2005/092930
PCT Pub. Date: Oct. 6, 2005

(65) Prior Publication Data
US 2008/0249000 A1    Oct. 9, 2008

(30) Foreign Application Priority Data

Mar. 25, 2004    (JP) .................................. 2004-90603

(51) Int. Cl.
*A23L 1/05*    (2006.01)
*A23L 1/053*    (2006.01)

(52) U.S. Cl.
USPC .......................................... 426/573; 426/654

(58) Field of Classification Search
USPC ............................................... 426/573, 654
See application file for complete search history.

(56) References Cited

U.S. PATENT DOCUMENTS 2,131,064 A * 9/1938 Musher .......................... 426/573
3,715,216 A    2/1973 Wuhrmann et al.

FOREIGN PATENT DOCUMENTS

| EP | 0108594 | 5/1984 |
|----|---------|--------|
| GB | 1260776 | 1/1972 |
| JP | 54-987 | 1/1979 |
| JP | 1-284333 | 11/1989 |
| JP | 2-49001 | 2/1990 |
| JP | 3-122101 | 5/1991 |
| JP | 6-54653 | 3/1994 |
| JP | 11178551 | 7/1999 |
| JP | 2000-166489 | 6/2000 |
| JP | 2003-321502 | 11/2003 |

OTHER PUBLICATIONS

Willams et al., Gum Arabic, Handbook of hydrocooloids, Wood head Publishing, 2000, pp. 155-168.*
Whistler R.L. ;"Industrial Gums, Polysaccharides and their Derivatives"; Second Edition (1973), Academic Press, pp. 197-263.*
EPO Office Communication dated Sep. 8, 2010.
European Search Report dated Sep. 8, 2010.
Supplementary European Search Report dated Aug. 7, 2008.

* cited by examiner

*Primary Examiner* — Jyoti Chawla
(74) *Attorney, Agent, or Firm* — Kratz, Quintos & Hanson, LLP (57) ABSTRACT

An object of the present invention is to provide a method for enhancing the emulsification ability of gum arabic.
The present invention can provide a modified gum arabic having an excellent emulsification ability without coloration and/or unpleasant odor, by a method which has a step of making unheated gum arabic into an aqueous solution having a concentration of not higher than 50 mass %, and a step of maintaining the aqueous solution below 60° C. for at least 6 hours. The gum arabic modified by the method of the present invention can be used as an emulsifier for use with beverages, confectioneries, chewing gums, oil-soluble flavors, oil-soluble colors, oil-soluble vitamins, etc.

7 Claims, 1 Drawing Sheet

US 8,460,734 B2

METHOD OF MODIFYING GUM ARABIC, MODIFIED GUM ARABIC OBTAINED BY THE METHOD, AND USE THEREOF

TECHNICAL FIELD

The present invention relates to a method for modifying gum arabic. More particularly, the invention relates to a method for enhancing the emulsification ability of gum arabic. The invention further relates to a gum arabic with its emulsification ability enhanced by the method, and use thereof.

BACKGROUND OF THE INVENTION

Gum arabic is a natural polymer having an excellent emulsification ability and a low viscosity even in the form of a high concentration solution, and, because of such characteristics, has been widely used as an emulsifier in the foods and pharmaceutical fields. However, it is also known that gum arabic, when used as is, does not exhibit satisfactory emulsifying properties.

Therefore, methods for enhancing the emulsification ability of gum arabic have been studied and proposed. For example, a method wherein metal ions are removed from gum arabic to obtain arabic acid and the thus-obtained arabic acid is then thermally modified to improve (modify) its emulsification ability (Patent Document 1), and a method wherein a gum arabic having a loss-on-drying weight of not more than 50 mass % is modified by heating at 60-140° C. for not less than 30 minutes to thereby enhance (modify) its emulsification ability (Patent document 2) have been disclosed.

However, these methods have problems such as coloration of gum arabic, generation of insoluble matter, and/or unpleasant odor during the heating process.

A method of modifying gum arabic, which comprises a step of controlling the moisture content of gum arabic to 3-30 mass % and a step of heating the gum arabic at not less than 30° C., has been disclosed (for example, in Patent document 3); however, such a method does not completely prevent coloration of the gum arabic.

[Patent document 1] Japanese Unexamined Patent Publication No. 1990-49001

[Patent document 2] Japanese Unexamined Patent Publication No. 2000-166489

[Patent document 3] Japanese Unexamined Patent Publication No. 2003-321502

SUMMARY OF THE INVENTION

Problem to be Solved by the Invention

An object of the present invention is to diminish or resolve the above problems and provide a method for modifying gum arabic having an enhanced emulsification ability. More particularly, an object of the present invention is to provide a method for efficiently enhancing the emulsification ability of gum arabic without the gum arabic suffering from coloration of and/or unpleasant odor.

Another object of the invention is to provide the thus-obtained gum arabic having excellent emulsification ability, and use of such gum arabic as an emulsifier.

Means for Solving the Problems

The present inventors conducted extensive research to overcome the above-mentioned problems and found that the above objects can be accomplished by maintaining unheated raw material gum arabic under the herein-defined temperature in a form of aqueous solution.

The present invention has been completed based on such findings. The present invention comprises the following embodiments:

Item 1. A method for modifying gum arabic comprising a step of making unheated gum arabic into an aqueous solution, and a step of maintaining the thus-obtained aqueous solution below 60° C.

Item 2. A method for modifying gum arabic according to Item 1, wherein the concentration of the aqueous gum arabic solution is not higher than 50 mass %.

Item 3. A method for modifying gum arabic according to Item 1 or 2, wherein the period of time for which the aqueous solution is maintained at below 60° C. is at least 6 hours.

Item 4. A method for modifying gum arabic according to Item 1 or 2, wherein the pH of the aqueous solution is 4.5 to 6 and the period of time for which the aqueous solution is maintained below 60° C. is at least 3 hours.

Item 5. A method for modifying gum arabic according to any one of Items 1 to 4 which is a method for enhancing the emulsification ability of gum arabic.

Item 6. A modified gum arabic obtained by a method of any one of Items 1 to 4.

Item 7. A modified gum arabic according to Item 6, wherein the unheated gum arabic belongs to the Acacia senegal species, and the modified gum arabic obtained by the method of Item 1 has a mass-average molecular weight of at least 1.5 million.

Item 8. An emulsifier containing the modified gum arabic obtained by a method of any one of Items 1 to 4 as an active ingredient.

Item 9. A method for preparing an emulsion using the modified gum arabic obtained by a method of any one of Items 1 to 4.

Item 10. A method for preparing an emulsion comprising the step of dispersing a hydrophobic material in a hydrophilic solvent or dispersing a hydrophilic material in a hydrophobic solvent using the modified gum arabic obtained by a method of any one of Items 1 to 4 as an emulsifier.

Item 11. A method for preparing an emulsion according to Item 10, wherein the emulsion is an O/W or W/O/W emulsion which contains, as a dispersoid, at least one hydrophobic substance selected from the group consisting of essential oils, oil-soluble flavors, oil-soluble colors, oil-soluble vitamins, polyunsaturated fatty acids, animal oils, vegetable oils, sucrose acetate isobutyrate, and medium-chain triglycerides.

Item 12. An emulsion prepared by the method according to Item 9 or 10.

Item 13. An emulsion according to Item 12 which is an O/W or W/O/W emulsion containing, as a dispersoid, at least one hydrophobic substance selected from the group consisting of essential oils, oil-soluble flavors, oil-soluble colors, oil-soluble vitamins, polyunsaturated fatty acids, animal oils, vegetable oils, sucrose acetate isobutyrate, and medium-chain triglycerides.

The present invention is explained below in detail.

(1) Method for Modifying Gum Arabic

The present invention relates to a method for modifying gum arabic so as to enhance its emulsification ability. Therefore, the invention can be said to be "a method for preparing a modifying gum arabic", "a method for enhancing the emulsification ability of gum arabic" or "a method for preparing a gum arabic having excellent emulsification ability".

The method of the present invention can be achieved by maintaining unheated natural gum arabic in the form of an aqueous solution under specific temperature conditions.

In the method of the invention, the gum arabic to be modified (unmodified gum arabic) is a natural resin (polysaccharide) prepared by drying gummy exudates from the trunks and branches of *Acacia senegal* or *Acacia seyal* of the genus *Acacia*, family Leguminasae, or any other plant belonging to the same genus. Preferably, *Acacia senegal* gum arabic is used.

While gum arabic (unmodified) is produced throughout the entire region of North Africa, as well as in Sudan, from Ethiopia to Senegal (Ethiopia, Senegal, Nigeria, the Kordofan region of North Africa, the basins of the tributaries of the River Nile, and the Amerah District), the gum arabic (unmodified) produced in any of the above areas can be employed in the present invention regardless of its origin.

The moisture content of gum arabic (unmodified) is not limited. The gum arabic (unmodified) that is usually available from commercial sources shows a reduction in moisture content when dried by heating at 105° C. for 6 hours (loss on drying) of not over 40 mass %, preferably not over 30 mass %, and more preferably not over 20 mass %. In the present invention, any gum arabic (unmodified) having such a moisture content (loss-on-drying) can be freely selected and used regardless of its moisture content.

Moreover, while gum arabic (unmodified) is usually procured in such forms as blocks, beads, crude pulverizates, pellets, and powders, any form can be used in the present invention. Preferable are crude pulverizates, pellets, and powders, because they can be quickly dissolved in waster.

In the present invention, unheated gum arabic is used as the raw material gum arabic to be modified. If gum arabic (unmodified) is exposed to a large amount of heat, the subsequently conducted modification will be extremely inefficient or the gum arabic will not be able to be modified.

It is preferable that dissolution be conducted at a temperature below 60° C., preferably not higher than 50° C., more preferably not higher than 40° C., and further more preferably not higher than 30° C. There is no particular minimum limit to the temperature as long as it is not less than 0° C., but generally not less than 10° C. A preferable temperature range is 10 to 40° C., and 15 to 30° C. is an even more preferable temperature range.

In the modification method of the present invention, because the aqueous solution is prepared using unheated gum arabic (unmodified), if a long time is spent during the dissolving process and retention process, proliferation of bacteria may occur. Given this as well, it is preferable that the present invention be conducted at the lowest possible temperature and for the shortest possible time so far as not to adversely affect the modification.

The content of gum arabic in the aqueous solution is not limited, but is generally not more than 50 mass %, preferably not more than 40 mass %, and more preferably not more than 30 mass %. There is no lowest limitation to the content, but it is generally not less than 10 mass %. If the content is less than 10 mass %, or greater than 30 mass %, a long time is required to modify the gum arabic. Therefore, from the viewpoint of modification efficiency, a preferable content range of gum arabic in the aqueous solution is 10 to 30 mass %.

In the modification method of the present invention, the temperature for retaining the aqueous gum arabic solution is generally below 60° C., preferably in the range of from 5 to 40° C., more preferably in the range of from 10 to 40° C., and further more preferably in the range of from 15 to 30° C. When the temperature is below 5° C., the modification speed is extremely slow, and when the temperature exceeds 40° C., the modification speed is slow, and therefore not preferable for efficiently conducting modification in a short time. Note that when the temperature exceeds 60° C., no modification will be observed. Furthermore, as in the below-described Test Examples, the closer the retention temperature of the aqueous gum arabic solution comes to the optimum temperature (15 to 30° C.), the more efficiently the emulsification ability of gum arabic can be enhanced.

The pH of a solution prepared by dissolving gum arabic (unmodified) as is in water is generally in the range of from 4 to 4.5; however, in the modification method of the present invention, the pH of the aqueous gum arabic solution to be treated may generally be 4 to 7, preferably 4 to 6, and more preferably 4.5 to 6. When the pH is below 4, modification barely proceeds, and when the pH exceeds 7, modification speed tends to be slow. In particular, when the aqueous gum arabic solution has a pH in the range of from 4.5 to 6, a modified gum arabic having a desired emulsification ability can be obtained in a short retention time, i.e., at least for 3 hours.

Various basic compounds can be used for increasing the pH of the aqueous gum arabic solution, and there is no limitation thereon as long as they can be applied to foods. Examples thereof include sodium hydroxide, sodium carbonate, sodium bicarbonate, sodium citrate, etc. It is also possible to increase the pH by using an anion exchange resin. There is no limitation on such anion exchange resins used, and examples thereof include Diaion SA10A (trademark, product of Mitsubishi Chemical Corporation, and likewise elsewhere), Diaion SA12A, Diaion SA20A, Diaion PA306, Diaion WA10, Diaion WA20, etc. There is no limitation on acids used for decreasing the pH of the aqueous gum arabic solution as long as they can ordinarily be used as food additives, and suitably selected from such acids. Examples thereof include citric acid, acetic acid, malic acid, lactic acid and like organic acids; sulfuric acid, hydrochloric acid, phosphoric acid, nitric acid and like inorganic acids; etc.

The gum arabic prepared by the method of the present invention is modified so as to exhibit an emulsification ability higher than the raw material gum arabic used (unmodified gum arabic). Therefore, the method of the present invention is specifically a modification method for enhancing the emulsification ability of gum arabic, and therefore it can be defined as a method for improving emulsification ability of gum arabic. It can also be defined as a method for producing a modified gum arabic having a high emulsification ability.

(2) Modified Gum Arabic and Use Thereof

The mass-average molecular weight of the modified gum arabic obtained by the above-described method is clearly distinctive from that of the unmodified gum arabic (raw material gum arabic) used. For example, when gum arabic belonging to the *Acacia senegal* species is used, the mass-average molecular weight of the unmodified gum arabic (raw material gum arabic used) is not more than 1 million Da, but the mass-average molecular weight of the modified gum arabic obtained in the present invention is not less than 1.5 million Da, and preferably not less than 2 million Da. Note that a method for measuring the mass-average molecular weight of gum arabic is explained in Test Example 1.

The modified gum arabic prepared by the above method can also be clearly distinguished from the unmodified gum arabic (raw material gum arabic) in that the former has a remarkably higher emulsification ability.

The emulsification ability of modified gum arabic can be evaluated by either the average particle diameter (during preparation of emulsion) of the droplets (dispersed phase)

forming the emulsion, or the stability of the emulsion over time, or both. The emulsification ability of the modified gum arabic is preferably such that, when an emulsion is prepared using it, the average particle diameter of the droplets (dispersed phase) forming the emulsion is not more than 1 µm, preferably not more than 0.8 µm, and still more preferably not more than 0.7 µm.

Furthermore, it is preferable that an emulsion prepared by using the modified gum arabic of the present invention be stable over time. This stability of the emulsion over time can be typically evaluated by measuring the average particle diameter of the prepared emulsion immediately after preparation [average particle diameter (a)] and after storage [average particle diameter (b)], and assessing the difference between the two values (b–a). Though not restricted, it is preferable that the gum arabic modified by the method of the present invention have an emulsification ability such that the emulsion has the above-mentioned difference of not more than 1 µm, preferably not more than 0.3 µm, still more preferably not more than 0.1 µm when stored at 60° C. for 3 days.

The modified gum arabic of the invention can be used with advantage as an emulsifier in the fields of foods, pharmaceuticals, quasi-drugs and cosmetics, particularly for products which may be taken orally. More particularly, it can be used with advantage as an emulsifier in the emulsification of foods and beverages such as drinks, snack confectioneries, processed fish products, processed animal products, etc., emulsification of coatings for tablets and other products, emulsification of oil soluble flavor, emulsification of oil soluble color, and other uses.

While the above-described modified gum arabic can be used as an emulsifier in the form of a simple solution, or dried and formed into granular or powdery form. It is also possible to formulate the modified gum arabic into an emulsifier by optionally adding other carriers and/or additives. In such cases, the carriers and additives can be suitably selected in a routine manner according to the kind and use of the product to be emulsified. For example, it can be used in admixture with saccharides, such as dextrin, maltose, lactose or the like, or polyhydric alcohols, such as glycerol, propylene glycol or the like.

(3) Method for Preparing Emulsion

The present invention further provides a method for preparing an emulsion using the modified gum arabic as an emulsifier. The emulsion can be prepared by dispersing and stabilizing a hydrophobic substance as a dispersoid in a hydrophilic solvent or by dispersing and stabilizing a hydrophilic substance as a dispersoid in a hydrophobic solvent, using the modified gum arabic as an emulsifier. Preferably, the emulsion is prepared by dispersing and stabilizing a hydrophobic substance as a dispersoid in a hydrophilic solvent, using the modified gum arabic as an emulsifier. The emulsion in the present context means an oil-in-water (O/W) emulsion or a W/O/W emulsion, for example.

A hydrophobic substance to be emulsified as above is not particularly restricted insofar as it is a substance which is typically put to use in the form of an emulsion or must be processed into an emulsion but is preferably a hydrophobic substance which is used in the fields of foods, pharmaceuticals, quasi-drugs, fragrances and/or cosmetics, and more preferably an (edible) hydrophobic substance which can be taken orally.

Specific examples thereof include essential oils available from source plants such as orange, lime, lemon, grapefruit and like citrus varieties; oleoresins obtainable from source plants such as pepper, cinnamon, ginger, etc., by the oleoresin process; absolutes obtainable from certain source plants such as jasmine, rose, etc., by the absolute process; synthetic flavor; oil soluble flavor such as oily prepared spices etc.; oil soluble color such as β-carotene, paprika color, lycopene, palm oil carotene, Donaliella carotene, carrot carotene, etc.; oil-soluble vitamins such as vitamins A, D, E and K; polybasic unsaturated fatty acids such as docosahexanoic acid, eicosapentanoic acid, γ-linolenic acid, etc.; animal and vegetable oils such as soybean oil, rapeseed oil, corn oil and fish oil; SAIB (sucrose acetate isobutyrate); ester gums; brominated oils; food processing oils such as $C_6$-$C_{12}$ medium-chain triglycerides; and mixtures of such edible oil materials.

The above-mentioned method for preparing an emulsion using the modified gum arabic is not particularly restricted; for example, the emulsion can be obtained by mechanically mixing a hydrophobic substance and a hydrophilic substance in the presence of the modified gum arabic by using a homogenizer or a high-pressure ejection technique in a manner well-established in the art of preparing oil-in-water (O/W) emulsions and W/O/W emulsions. More particularly, the following method can be exemplified.

First, the modified gum arabic is dissolved in a hydrophilic solvent, such as water, and optionally contaminants are removed by a suitable solid-liquid separation means such as centrifugation or filtration with a filter press or the like to give an aqueous gum arabic solution. As long as the modified gum arabic prepared by the above method is in a form of aqueous solution, such a solution may be used in the following emulsification process as is or, if necessary, by having its concentration adjusted using a hydrophilic solvent. By using a stirrer, for instance, the objective hydrophobic substance can be admixed into the solution for preliminary emulsification. During this operation, the specific gravity may optionally be adjusted with a specific gravity control agent such as SAIB. The preliminary emulsion thus obtained is then emulsified using an emulsification machine.

Examples of hydrophilic solvents include water, and glycerol, propylene glycol and like polyhydric alcohols.

While the hydrophobic substance encompasses the substances mentioned previously, when an emulsified flavor or an emulsified color is to be prepared by using oil soluble flavor or oil soluble color, it is preferable to use a mixture prepared by dissolving the oil soluble flavor or color in an oil or fat beforehand as the hydrophobic substance. By doing so, the emulsification can be made more stable and evaporation of the components can be prevented. Oils and fats in which such oil soluble flavor and color are to be dissolved are not particularly restricted, but usually medium-chain triglycerides ($C_{6-12}$ fatty acid triglycerides) and vegetable oils such as corn oil, safflower oil and soybean oil are employed.

Many oil soluble color, such as β-carotene, exist in a crystalline form as a suspension. Therefore, in order to prepare these oil soluble color into emulsions (color emulsions), it is preferable that the crystals of the color be admixed with and dissolved in a suitable oil or fat at a high temperature, and then mixed with the modified gum arabic solution obtained by dissolution in a hydrophilic solvent.

The emulsifying machine for use in the emulsification is not particularly restricted, but can be suitably selected according to the particle size of the objective emulsion and the viscosity of the material. For example, not only can mechanical-high-pressure homogenizers be employed but also emulsifying machines such as Disper Mills, colloid mills, etc.

As mentioned above, the emulsification can be carried out by adding a hydrophobic substance to a solution obtained by dissolving gum arabic in a hydrophilic solvent with stirring, subjecting the resultant solution to preliminary emulsification using a homogenizer or the like emulsifier to obtain particles having very small and uniform diameters (e.g., average particle diameter of not more than 1 μm, preferably not more than 0.8 μm and more preferably not more than 0.7 μm).

Compared with an emulsion prepared using natural (unmodified) gum arabic, an emulsion thus-prepared using the modified gum arabic has smaller and more uniform particle diameters and is more stable over time. Furthermore, degradation of the emulsion particles caused by agglomerating, adhering, etc., due to stresses (severe conditions) such as heating, long-term storage, change over time, etc., can be significantly reduced.

Industrial Applicability

Modified gum arabic having excellent emulsification ability can be obtained by retaining unheated gum arabic in the form of aqueous solution under specific temperature conditions. The resulting modified gum arabic according to the invention can be used for the emulsification of various hydrophobic substances such as essential oils, oil-soluble color, oil-soluble flavor, oil-soluble vitamins, and so on. Compared with an emulsion prepared by using ordinary (unmodified) gum arabic, an emulsion prepared by using the modified gum arabic of the invention has more uniform particle diameter and exhibits high stability against stresses (severe conditions) such as heating, long-term storage, change over time etc., so that it does not exhibit degradation of the particles due to aggregating, adhering, etc. Therefore, the thus-obtained modified gum arabic can be suitably used for emulsifiers for use in beverages, confectioneries, chewing gums, oil-soluble flavors, oil-soluble colors, oil-soluble vitamins, etc.

BEST MODE FOR CARRYING OUT THE INVENTION

The following experimental examples (Test Examples, Comparative Examples, and Examples) illustrate the present invention in detail. They are, however, by no means limitative of the scope of the present invention. It should also be understood that, in the following Test examples, all 'parts' are 'parts by mass' and % represent 'mass %' unless otherwise indicated. The raw material gum arabic (in the following experiment examples, referred to as gum arabic (unmodified) or unmodified gum arabic) used was a roughly crushed solid which was obtained by drying and crushing the gummy exudate collected from the trunks and branches of *Acacia senegal* in Sudan (average fragment diameter of about 0.3 mm, water content of 14%, and average molecular weight of 698,000).

TEST EXAMPLE 1

Unmodified gum arabic (2 kg) was placed in 8 kg of water of different temperatures (20 to 80° C.), and dissolved with stirring for 30 minutes, giving 20 mass % aqueous gum arabic solutions (pH 4.2). The thus-obtained aqueous gum arabic solutions were allowed to stand in a thermostated room at 25° C. for 12 hours. The resultant gum arabic was evaluated for its emulsification ability (average particle diameter), mass-average molecular weight, molecular weight of AGP (arabinogalactan protein), and AGP content in the following manner.
<Evaluation Methods>
(1) Evaluation of Emulsification Ability
To 800 g of one of each 20 mass % aqueous gum arabic solution was added 200 g of medium-chain triglyceride (product name: octanoic/decanoic acid triglyceride O.D.O., product of Nisshin Oillio Group, Ltd.), and the mixtures were emulsified using a homogenizer (product of APV Gaulin) (homogenized 4 times at a pressure of 44 MPa (450 kg/cm$^2$)), giving emulsions.

The average particle diameter of one of the resulting emulsions was measured immediately after emulsification and after 3 days of storage at 60° C. using a particle size distribution analyzer (SALD-1100 Laser Diffraction Particle Size Analyzer, product of Shimadzu). Generally, the smaller the average particle diameter of the emulsion prepared using the emulsifier becomes, the better emulsification ability of an emulsifier is ("Study by the turbidimetric assay method of O/W emulsions emulsified with gum arabic", Yakugaku Zasshi (Pharmacology Journal), 112(12) 906-913, (1992)). The emulsification stability can be determined based on the difference between the average particle diameter of each emulsion immediately after emulsification and the average particle diameter of the emulsion after 3 days of storage at 60° C.
(2) Mass-Average Molecular Weight, Molecular Weight of AGP, and AGP Content The mass-average molecular weight of gum arabic, molecular weight of AGP, and AGP content can be determined by the use of gel permeation chromatography wherein three detectors, i.e., a multi-angle laser light scattering (MALLS) detector, a refractive index (RI) detector, and an ultraviolet (UV) detector, are coupled on-line, and by processing the obtained data using ASTRA Version 4.9 (Wyatt Technology) software. According to the GPC-MALLS technique, the molecular weight is measured by the MALLS detector, the mass of each component (compositional ratio) is measured by the RI detector, and the protein content is measured by the UV detector. Therefore, it is possible to obtain the molecular weight and the composition of the analyzed components without reference to a standard gum arabic sample of known molecular weight. For detailed principals and characteristics of GPC-MALLS, see Idris, O. H. M., Williams, P. A. Phillips, G. O.; Food Hydrocolloids, 12, (1998) pp. 375-388.

The GPC-MALLS measuring conditions employed in the present invention are as follows:

| Column: | Superose 6 10/300 GL (Amersham Biosciences) |
|---|---|
| Flow rate: | 0.5 mL/minute |
| Eluant: | 0.2 M NaCl |
| Preparation of sample: | The sample to be analyzed is diluted with the eluant (0.2 M NaCl), and insoluble matter is then removed using a 0.45 μm celluloseacetate membrane filter. |
| Sample concentration: | 0.1% (W/V) |
| Injection volume of sample solution: | 100 μL |
| dn/dc: | 0.141 |
| Temperature: | Room temperature |
| Detector: | (1) MALLS (multi angle laser light scattering): DAWN EOS (product of Wyatt Technology Inc., USA), (2) RI (refractive index), and (3) UV detector (absorption at 214 nm) |

<Mass-Average Molecular Weight>
When the data is processed considering all of the peaks on the chromatogram obtained using the RI detector as a single peak, the obtained molecular weight is identified as the mass-average molecular weight (MW) of the present invention (specifically, "MW processed as one peak"). When the point where the RI plot begins to rise from the baseline of the chromatogram is defined as the "starting point", and the point where the RI chart falls and touches the baseline is defined as the "ending point", the aforementioned single peak of the chromatogram means the area from the starting point to the ending point. Because the mass-average molecular weight increases as the emulsification ability increases, the mass-average molecular weight is an index for evaluating emulsification ability.

<AGP Molecular Weight and AGP Content>

Specifically, when the RI Chart of a chromatogram obtained using the RI detector is divided into two parts, i.e., RI peak fraction 1 (Peak 1) (high molecular weight fraction) which traces the first eluted portion, and RI peak fraction 2 (Peak 2) (low molecular weight fraction) which traces the later eluted portion, and the data are then processed (processed at two peaks) with ASTRA Version 4.9 (Wyatt Technology) software, the obtained mass calculated molecular weight of Peak 1 corresponds to the AGP molecular weight (AGP-MW). The recovery ratio of Peak 1 (mass %) corresponds to the "AGP content (mass %)" of the gum arabic supplied to GPC-MALLS.

Figure 1:
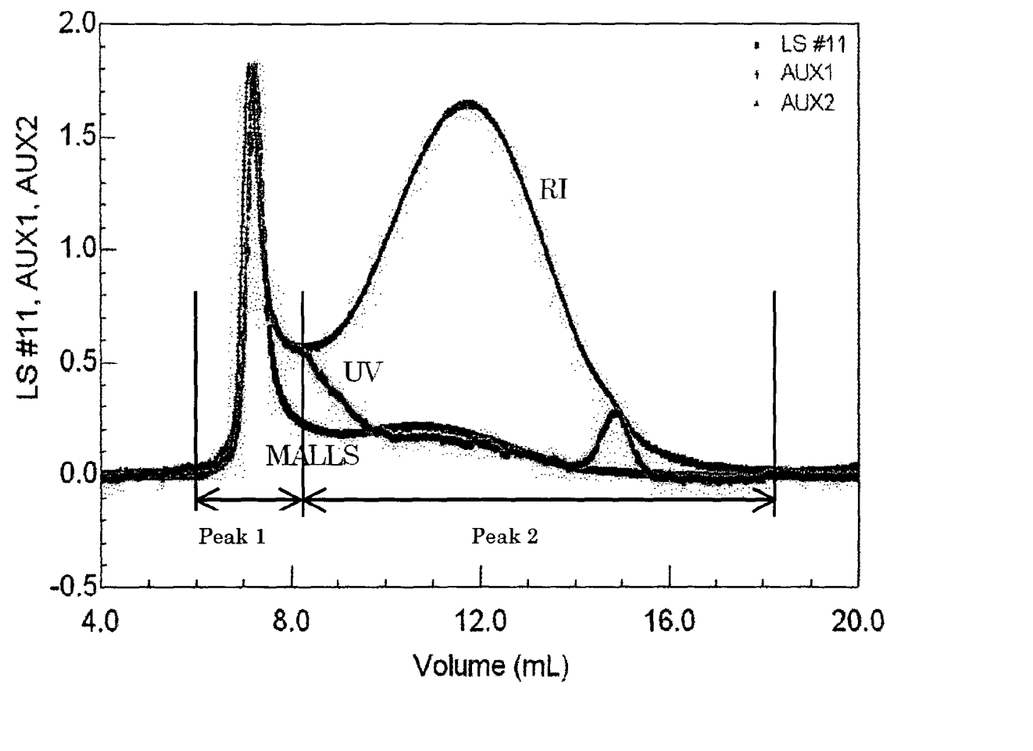

This is explained in detail with reference to a chromatogram (FIG. 1) showing the results wherein unmodified gum arabic (*A. senegal*) was analyzed using GPC-MALLS. In the RI chromatogram, the point where the RI chart begins to rise from the baseline of the chromatogram is defined as the "starting point" and the point where the RI chart falls and intercepts the base line is defined as the "ending point". Between the starting point and the ending point, the point where the RI value shows a minimum is defined as the boundary, with the area eluted before the boundary being defined as RI peak fraction 1 (Peak 1) and the area eluted after the boundary being defined as RI peak fraction 2 (Peak 2). Arabinogalactan protein (simply referred to as "AGP") is one of the three main components contained in gum arabic, together with arabinogalactans (AG) and glycoproteins (GP). As the emulsification ability increases, the molecular weight of the AGP and the AGP content of the gum arabic also increase, and therefore they can serve as indices of the emulsification ability of the gum arabic.

Table 1 shows the results of evaluating the emulsification ability, mass-average molecular weight, AGP molecular weight and AGP content of the gum arabic solutions obtained in Test Example 1.

As shown in Table 1, the gum arabic solutions dissolved at 60° C. and 80° C. were not improved in emulsification ability even when allowed to stand at 25° C., and exhibited little increase in the mass-average molecular weight and AGP content. In contrast, when a gum arabic solution dissolved at a temperature lower than 60° C., e.g., at 20° C., was allowed to stand at 25° C., the mass-average molecular weight thereof increased from 698,000 Da to 1.75 million Da, the AGP molecular weight increased from 2.517 million Da to 8.049 million Da, and the AGP content increased from 13.8% to 17.5%. Accordingly, the emulsification ability and emulsification stability significantly increased. When a gum arabic solution dissolved at 40° C. was allowed to stand at 25° C., the mass-average molecular weight thereof increased from 698,000 Da to 1.171 million Da, the AGP molecular weight increased from 2.517 million Da to 4.932 million Da, and the AGP content increased from 13.8% to 17%. Accordingly, the emulsification ability and emulsification stability significantly increased.

TEST EXAMPLE 2

Unmodified gum arabic (2 kg) was placed in 8 kg of water and dissolved while stirring at room temperature (25° C.) for 30 minutes, giving a 20 mass % aqueous gum arabic solution (pH 4.2). Samples of the resultant aqueous gum arabic solution were allowed to stand under the following temperature conditions for 6 to 18 hours, and their emulsifying abilities, mass-average molecular weights, AGP molecular weights, and AGP contents were evaluated in the same manner as in Test Example 1.

Condition 1) 5° C.
Condition 2) 10° C.
Condition 3) 15° C.
Condition 4) 20° C.
Condition 5) 25° C.
Condition 6) 30° C.
Condition 7) 40° C.
Condition 8) 50° C.
Condition 9) 60° C.

Table 2 shows the results of emulsification ability, mass-average molecular weight, AGP molecular weight, AGP content of the gum arabic aqueous solution samples obtained in Test Example 2.

TABLE 1

| | | GPC-MALLS analysis | | | Emulsification stability Average particle diameter (μm) | | |
| --- | --- | --- | --- | --- | --- | --- | --- |
| Sample | Conditions | Average MW (×10000) | AGP MW (×10000) | AGP content (%) | Immediately after emulsification | Stored at 60° C. for 3 days | Change |
| | Gum arabic (unmodified) | 69.8 | 251.7 | 13.8 | 0.90 | 2.55 | 1.65 |
| 1-1 | Dissolved at 20° C. and allowed to stand at 25° C. for 12 hours | 175.0 | 804.9 | 17.5 | 0.68 | 0.75 | 0.07 |
| 1-2 | Dissolved at 40° C. and allowed to stand at 25° C. for 12 hours | 117.1 | 493.2 | 17.0 | 0.76 | 1.12 | 0.36 |
| 1-3 | Dissolved at 60° C. and allowed to stand at 25° C. for 12 hours | 79.7 | 304.5 | 14.5 | 0.89 | 2.18 | 1.29 |
| 1-4 | Dissolved at 80° C. and allowed to stand at 25° C. for 12 hours | 69.3 | 251.9 | 13.9 | 0.92 | 2.42 | 1.50 |

TABLE 2

| Sample | Conditions | GPC-MALLS analysis | | | Emulsification stability Average particle diameter (μm) | | |
|---|---|---|---|---|---|---|---|
| | | Average MW (×10000) | AGP MW (×10000) | AGP content (%) | Immediately after emulsification | Stored at 60° C. for 3 days | Change |
| | Gum arabic (unmodified) | 69.8 | 251.7 | 13.8 | 0.90 | 2.55 | 1.65 |
| 2-1 | Dissolved at room temperature and allowed to stand at 5° C. for 6 hours | 72.4 | 279.2 | 14.0 | 0.91 | 2.59 | 1.68 |
| | Dissolved at room temperature and allowed to stand at 5° C. for 18 hours | 116.8 | 507.3 | 16.7 | 0.86 | 1.30 | 0.44 |
| 2-2 | Dissolved at room temperature and allowed to stand at 10° C. for 6 hours | 75.2 | 286.6 | 14.6 | 0.89 | 2.47 | 1.58 |
| | Dissolved at room temperature and allowed to stand at 10° C. for 18 hours | 146.3 | 656.4 | 17.3 | 0.73 | 0.96 | 0.23 |
| 2-3 | Dissolved at room temperature and allowed to stand at 15° C. for 6 hours | 93.3 | 375.4 | 15.9 | 0.82 | 1.56 | 0.74 |
| | Dissolved at room temperature and allowed to stand at 15° C. for 18 hours | 222.6 | 1090 | 17.2 | 0.63 | 0.66 | 0.03 |
| 2-4 | Dissolved at room temperature and allowed to stand at 20° C. for 6 hours | 89.5 | 364.5 | 15.6 | 0.85 | 1.68 | 0.83 |
| | Dissolved at room temperature and allowed to stand at 20° C. for 18 hours | 211.3 | 1040 | 17.0 | 0.63 | 0.69 | 0.06 |
| 2-5 | Dissolved at room temperature and allowed to stand at 25° C. for 6 hours | 80.6 | 329.1 | 14.9 | 0.86 | 1.65 | 0.79 |
| | Dissolved at room temperature and allowed to stand at 25° C. for 18 hours | 217.4 | 1068 | 17.0 | 0.64 | 0.69 | 0.05 |
| 2-6 | Dissolved at room temperature and allowed to stand at 30° C. for 6 hours | 75.4 | 285.5 | 14.6 | 0.88 | 2.42 | 1.54 |
| | Dissolved at room temperature and allowed to stand at 30° C. for 18 hours | 185.7 | 956.3 | 17.0 | 0.70 | 0.80 | 0.10 |
| 2-7 | Dissolved at room temperature and allowed to stand at 40° C. for 6 hours | 77.5 | 296.7 | 15.4 | 0.90 | 2.35 | 1.45 |
| | Dissolved at room temperature and allowed to stand at 40° C. for 18 hours | 115.7 | 494.2 | 16.8 | 0.74 | 1.14 | 0.30 |
| 2-8 | Dissolved at room | 70.2 | 258.9 | 14.3 | 0.92 | 2.54 | 1.62 |

TABLE 2-continued

| | | GPC-MALLS analysis | | | Emulsification stability Average particle diameter (μm) | | |
|---|---|---|---|---|---|---|---|
| Sample | Conditions | Average MW (×10000) | AGP MW (×10000) | AGP content (%) | Immediately after emulsification | Stored at 60° C. for 3 days | Change |
| | temperature and allowed to stand at 50° C. for 6 hours | | | | | | |

As is clear from Table 2, the emulsification ability was improved after being allowed to stand for 18 hours under all temperature conditions. Samples after being allowed to stand for 18 hours were compared and the results were such that those allowed to stand at 15 to 30° C., and at 15 to 25° C. in particular exhibited excellent emulsification stability even after being stored at 60° C. for 3 days, and did not suffer from change in the particle appearance, and also exhibited high mass-average molecular weights and AGP contents. Those allowed to stand under high temperature conditions, i.e., 50° C. and 60° C., had a mass-average molecular weight and AGP content almost the same as those of unmodified gum arabic, and exhibited relatively little improvement in emulsification ability.

TEST EXAMPLE 3

Gum arabic (unmodified) was dissolved in water in the same manner as in Test Example 1 so that the resultant solutions (pH 4.2) had different concentrations (1 to 40%) at room temperature (25° C.). The resultant solutions were allowed to stand in a refrigerator at 15° C. for 9 to 24 hours, and the mass-average molecular weights, AGP molecular weights, and the AGP contents thereof were evaluated in the same manner as in Test Example 1. Table 3 shows the results.

As is clear from the results of Table 3, increase in the mass-average molecular weight, AGP molecular weight, and AGP content were observed in every sample. In particular, the samples having concentrations of 5 to 30%, particularly 10 to 30% exhibited remarkable increases in mass-average molecular weight, AGP molecular weight, and AGP content.

TEST EXAMPLE 4

Unmodified gum arabic (2 kg) was placed in 8 kg of water and dissolved while stirring at room temperature (25° C.) for 30 minutes, giving 20 mass % aqueous gum arabic solutions (pH 4.2). To the resultant solutions were added 85% phosphoric acid or 5% sodium hydroxide so as to have various pH values (pH 3.5 to 8.5), and allowed to stand in a refrigerator at 15° C. for 6 to 18 hours. The emulsification abilities, mass-average molecular weights, AGP molecular weights, and AGP contents were evaluated in the same manner as in Test Example 1. Table 4 shows the emulsification abilities, mass-average molecular weights, AGP molecular weights, and AGP contents of the resultant gum arabic solutions.

TABLE 3

| | | GPC-MALLS analysis | | |
|---|---|---|---|---|
| Sample | Conditions | Average MW (×10000) | AGP MW (×10000) | AGP content (%) |
| | Gum arabic (unmodified) | 69.8 | 251.7 | 13.8 |
| 3-1 | 1% solution allowed to stand at 15° C. for 9 hours | 78.1 | 314.3 | 14.9 |
| | 1% solution allowed to stand at 15° C. for 24 hours | 80.5 | 325.7 | 15.0 |
| 3-2 | 5% solution allowed to stand at 15° C. for 9 hours | 117.7 | 503.6 | 16.8 |
| | 5% solution allowed to stand at 15° C. for 24 hours | 122.0 | 533.1 | 16.6 |
| 3-3 | 10% solution allowed to stand at 15° C. for 9 hours | 131.9 | 582.7 | 16.8 |
| | 10% solution allowed to stand at 15° C. for 24 hours | 195.9 | 998.2 | 17.1 |
| 3-4 | 20% solution allowed to stand at 15° C. for 9 hours | 156.3 | 724.2 | 16.9 |
| | 20% solution allowed to stand at 15° C. for 24 hours | 203.2 | 1024 | 16.5 |
| 3-5 | 30% solution allowed to stand at 15° C. for 9 hours | 122.6 | 550.0 | 16.2 |
| | 30% solution allowed to stand at 15° C. for 24 hours | 175.3 | 848.2 | 17.0 |
| 3-6 | 40% solution allowed to stand at 15° C. for 9 hours | 83.2 | 319.9 | 14.9 |
| | 40% solution allowed to stand at 15° C. for 24 hours | 100.4 | 432.2 | 15.9 |

TABLE 4

| Sample | Conditions | GPC-MALLS analysis | | | Emulsification stability Average particle diameter (μm) | | |
|---|---|---|---|---|---|---|---|
| | | Average MW (×10000) | AGP MW (×10000) | AGP content (%) | Immediately after emulsification | Stored at 60° C. for 3 days | Change |
| | Gum arabic (unmodified) | 69.8 | 251.7 | 13.8 | 0.90 | 2.55 | 1.65 |
| 4-1 | pH 3.5 solution allowed to stand at 15° C. for 6 hours | 69.4 | 261.7 | 13.4 | 0.92 | 2.61 | 1.69 |
| | pH 3.5 solution allowed to stand at 15° C. for 18 hours | 71.0 | 271.4 | 13.5 | 0.90 | 2.54 | 1.64 |
| 4-2 | pH 3.7 solution allowed to stand at 15° C. for 6 hours | 74.0 | 275.2 | 14.0 | 0.89 | 2.25 | 1.36 |
| | pH 3.7 solution allowed to stand at 15° C. for 18 hours | 92.7 | 374.5 | 16.0 | 0.84 | 1.76 | 0.92 |
| 4-3 | pH 4.0 solution allowed to stand at 15° C. for 6 hours | 91.9 | 375.4 | 16.1 | 0.85 | 1.69 | 0.84 |
| | pH 4.0 solution allowed to stand at 15° C. for 18 hours | 190.3 | 953.3 | 16.6 | 0.65 | 0.72 | 0.07 |
| 4-4 | pH 4.2 solution allowed to stand at 15° C. for 6 hours | 117.1 | 512.4 | 16.6 | 0.78 | 0.99 | 0.21 |
| | pH 4.2 solution allowed to stand at 15° C. for 18 hours | 207.5 | 1019.2 | 17.3 | 0.63 | 0.67 | 0.04 |
| 4-5 | pH 4.5 solution allowed to stand at 15° C. for 6 hours | 194.0 | 962.1 | 16.9 | 0.64 | 0.69 | 0.05 |
| | pH 4.5 solution allowed to stand at 15° C. for 18 hours | 215.5 | 1069 | 16.9 | 0.62 | 0.67 | 0.05 |
| 4-6 | pH 5.0 solution allowed to stand at 15° C. for 6 hours | 210.5 | 1062 | 16.6 | 0.62 | 0.66 | 0.04 |
| | pH 5.0 solution allowed to stand at 15° C. for 18 hours | 223.6 | 1106 | 17.1 | 0.62 | 0.66 | 0.04 |
| 4-7 | pH 5.7 solution allowed to stand at 15° C. for 6 hours | 181.2 | 909 | 16.2 | 0.67 | 0.76 | 0.09 |
| | pH 5.7 solution allowed to stand at 15° C. for 18 hours | 196.9 | 1010 | 16.3 | 0.63 | 0.67 | 0.04 |
| 4-8 | pH 6.8 solution allowed to stand at 15° C. for 6 hours | 156.3 | 799.5 | 15.9 | 0.70 | 0.90 | 0.20 |
| | pH 6.8 solution allowed to stand at 15° C. for 18 hours | 183.7 | 940.6 | 16.1 | 0.66 | 0.79 | 0.13 |
| 4-9 | pH 8.5 solution allowed to stand at 15° C. for 6 hours | 88.8 | 344.0 | 14.7 | 0.86 | 1.93 | 1.07 |
| | pH 8.5 solution allowed to stand at 15° C. for 18 hours | 114.0 | 469.3 | 15.2 | 0.79 | 1.05 | 0.26 |

As is clear from the results shown in Table 4, the solutions having a pH of 3.7 to 8.5 exhibited an increase in the mass-average molecular weight, AGP molecular weight, AGP content, and an improvement in emulsification ability and emulsification stability. In particular, the solutions having their pH adjusted to 4.5 to 5.7 exhibited a high mass-average molecular weight and AGP content after being allowed to stand for 6 hours, and the emulsification ability and emulsification stability were remarkably improved.

Furthermore, solutions having a pH of 4.2 or 5.0 were allowed to stand in a refrigerator at 15° C. for 1.5 to 9 hours, sampling was conducted from time to time, and the emulsification ability, mass-average molecular weight, AGP molecular weight, and AGP content thereof were measured in the same manner as described above. Table 5 shows the results of emulsification abilities, mass-average molecular weights, AGP molecular weights, and the AGP contents of resultant gum arabic solutions.

TABLE 5

| Sample | Conditions | GPC-MALLS analysis | | | Emulsification stability Average particle diameter (μm) | | |
|---|---|---|---|---|---|---|---|
| | | Average MW (×10000) | AGP MW (×10000) | AGP content (%) | Immediately after emulsification | Stored at 60° C. for 3 days | Change |
| | Gum arabic (unmodified) | 69.8 | 251.7 | 13.8 | 0.90 | 2.55 | 1.65 |
| 4-10 | pH 4.2 solution allowed to stand at 15° C. for 1.5 hours | 69.1 | 259.3 | 13.7 | 0.91 | 2.49 | 1.58 |
| | pH 4.2 solution allowed to stand at 15° C. for 3 hours | 70.8 | 268.2 | 14.1 | 0.90 | 2.35 | 1.55 |
| | pH 4.2 solution allowed to stand at 15° C. for 4.5 hours | 93.3 | 375.4 | 15.9 | 0.83 | 1.54 | 0.71 |
| | pH 4.2 solution allowed to stand at 15° C. for 6 hours | 117.1 | 512.4 | 16.6 | 0.78 | 0.99 | 0.21 |
| | pH 4.2 solution allowed to stand at 15° C. for 9 hours | 157.9 | 757.9 | 17.1 | 0.69 | 0.79 | 0.10 |
| 4-11 | pH 5.0 solution allowed to stand at 15° C. for 1.5 hours | 75.0 | 279.3 | 14.1 | 0.89 | 2.30 | 1.41 |
| | pH 5.0 solution allowed to stand at 15° C. for 3 hours | 152.0 | 698.1 | 17.0 | 0.68 | 0.81 | 0.13 |
| | pH 5.0 solution allowed to stand at 15° C. for 4.5 hours | 189.5 | 917.5 | 16.9 | 0.66 | 0.71 | 0.05 |
| | PH 5.0 solution allowed to stand at 15° C. for 6 hours | 210.5 | 1062 | 16.6 | 0.62 | 0.66 | 0.04 |
| | pH 5.0 solution allowed to stand at 15° C. for 9 hours | 237.9 | 1196 | 17.0 | 0.63 | 0.65 | 0.02 |

As is clear from the results of Table 5, the gum arabic solutions having a pH of 5.0 exhibited a satisfactory increase in AGP content and an improvement in emulsification ability and emulsification stability after being allowed to stand for at least 3 hours, and preferably for 4.5 hours.

TEST EXAMPLE 5

(1) Preparation Example 1

Room temperature water (1600 kg) was put into a 2400 L stainless steel tank, 400 kg of pulverized unmodified gum arabic was added thereto while stirring, and mixed while stirring at room temperature (25° C.) for 30 minutes (pH 4.2). Thereafter, 0.8 kg of 50% sodium hydroxide wad added thereto so that the pH of the solution became 4.7, the temperature of the aqueous gum arabic solution was cooled to 15° C. by passing cool water through a water jacket, and the aqueous gum arabic solution was then maintained at 15° C. for 6 hours. Steam was then made to pass thought the jacket so that the aqueous gum arabic solution was heated to 60° C., impurities were removed by filter press, sterilization was conducted at 80° C. for 30 minutes, and the aqueous gum arabic solution was dried by spray drying (spray drying conditions: inlet temperature of 180° C., and outlet temperature of 100° C.), giving 350 kg of spray-dried powder.

(2) Comparative Example 1

Hot water (80° C., 1600 kg) was put into a 2400 L stainless steel tank, 400 kg of pulverized unmodified gum arabic was added thereto while stirring, and then dissolved while stirring for 30 minutes. The aqueous gum arabic solution had a pH of 4.2. Impurities were removed by filter press, sterilization was conducted at 80° C. for 30 minutes, and the aqueous gum arabic solution was then dried by spray drying (spray drying conditions: inlet temperature at 180° C., and outlet temperature at 100° C.), giving 360 kg of spray-dried powder.

The mass-average molecular weights, AGP molecular weights, and AGP contents of the spray-dried powders obtained in Preparation Example 1 and Comparative Example 1 were measured in the same manner as in Test Example 1. The powders were dissolved in water in such a manner to obtain 20% aqueous solutions, and the emulsification abilities thereof were evaluated. Table 6 shows the results.

TABLE 6

| Sample | Conditions | GPC-MALLS analysis | | | Emulsification stability Average particle diameter (μm) | | |
|---|---|---|---|---|---|---|---|
| | | Average MW (×10000) | AGP MW (×10000) | AGP content (%) | Immediately after emulsification | Stored at 60° C. for 3 days | Change |
| Preparation Ex. 1 | Room temperature solution, pH 4.7, allowed to stand at 15° C. for 6 hours | 255.4 | 1235 | 18.0 | 0.60 | 0.62 | 0.02 |
| Comp. Ex. 1 | Dissolved at 80° C., pH not adjusted, Not allowed to stand | 72.6 | 292.1 | 13.3 | 0.92 | 2.61 | 1.69 |

The following Examples 1 to 5 were conducted using spray-dried modified gum arabic powders obtained in Preparation Example 1.

EXAMPLE 1

β-Carotene Emulsion (Emulsified Colorant Preparation)

In 680 g of water was dissolved 170 g of modified gum arabic (spray-dried powder), giving an aqueous 20 mass % gum arabic solution. Using this solution as an emulsifier, a mixed solution obtained by dissolving 100 g of medium-chain triglyceride (octanoic/decanoic acid triglyceride O.D.O™, product of the Nisshin Oillio Group, Ltd.) and 50 g of a 30% suspension of β-carotene by heating at 150° C. was added to the solution followed by stirring. The resultant mixture was emulsified using a homogenizer (product of APV Gaulin) (homogenized 4 times at a pressure of 4.4 MPa (450 kg/cm²)) to give a β-carotene emulsion (emulsified colorant preparation).

EXAMPLE 2

Orange Emulsion Flavoring (Flavor Emulsions)

In 680 g of water was dissolved 170 g of modified gum arabic (spray-dried powder), giving an aqueous 20 mass % gum arabic solution. Using this solution as an emulsifier, a mixture solution obtained by dissolving 100 g of medium-chain triglyceride (octanoic/decanoic acid triglyceride O.D.O™ (product of the Nisshin Oil lio Group, Ltd.)) and 20 g of an orange flavor at room temperature was added to the solution followed by stirring. The resultant mixture was emulsified using a homogenizer (product of APV Gaulin) (homogenized 4 times at the pressure of 4.4 MPa (450 kg/cm²)) to give an orange emulsion flavoring (emulsified flavoring).

EXAMPLE 3

DHA (Docosahexaenoic Acid) Emulsion

In 680 g of water, was dissolved 170 g of modified gum arabic (spray-dried powder), giving an aqueous 20 mass % gum arabic solution. Using this solution as an emulsifier, a mixed solution obtained by mixing 100 g of medium-chain triglyceride (octanoic/decanoic acid triglyceride O.D.O™, product of the Nisshin Oil lio Group, Ltd.) and 50 g of a fish oil with a 20% DHA content by heating at 80° C. was added to the solution followed by stirring. The resultant mixture was emulsified using a homogenizer (product of APV Gaulin) (homogenized 4 times at the pressure of 4.4 MPa (450 kg/cm²)) to give a DHA emulsion.

EXAMPLE 4

Powdered Lemon Flavor

Powdered modified gum arabic (spray-dried powder, 200 g) and 600 g of dextrin were dissolved in 1500 g of water, giving an aqueous gum arabic solution. The thus-obtained aqueous gum arabic solution was used as an emulsifier, and 200 g of lemon oil was added thereto, followed by stirring. The mixture was emulsified using a homogenizer (product of APV GAULIN, homogenizing at a pressure of 2.0 MPa (i.e., 200 kg/cm²) was conducted once). The thus-obtained solution was spray dried using a spray-dryer (product of ANHYDRO, inlet temperature of 140° C., and outlet temperature of 80° C.), giving 950 g of powdered lemon flavor.

EXAMPLE 5

Coating for Chewing Gum

Modified gum arabic (spray-dried powder, 800 g), 600 g of xylitol, and 25 g of titanium dioxide was dissolved in 1 kg of water, and subjected to a heat treatment at 80° C., preparing a gum syrup. 2 kg of chewing gum center was placed in a coating pan and rotated while being supplied with dry air. The gum syrup was applied to the gum center little by little and completely dried, thus coating the chewing gum.

BRIEF DESCRIPTION OF DRAWINGS

FIG. 1 is a chromatogram showing the results of analyzing unmodified gum arabic (*Acacia senegal* species) by GPC-MALLS method. In the RI chromatogram, the point where the RI chart begins to rise from the baseline of the chromatogram is defined as the "starting point" and the point where the RI chart falls and intercepts the base line is defined as the "ending point". Between the starting point and the ending point, the point where the RI value shows a minimum is defined as the boundary, with the area eluted before the boundary being defined as RI peak fraction 1 (Peak 1) and the area eluted after the boundary being defined as RI peak fraction 2 (Peak 2).

The invention claimed is:
1. A method for enhancing the emulsification ability of gum arabic comprising a step of making unheated gum arabic into an aqueous solution with pH range of 4.5 to 6 wherein the concentration of aqueous gum arabic solution is not higher than 50 mass %, and a step of maintaining the thus-obtained aqueous solution at 5° C. to 40° C.

2. The method according to claim 1, wherein the concentration of the aqueous gum arabic solution is 10 to 30 mass %.

3. The method according to claim 1, wherein the time for which the aqueous solution is maintained at 5° C. to 40° C. is at least 6 hours.

4. The method according to claim 1 wherein the time for which the aqueous solution is maintained at 5° C. to 40° C. is at least 3 hours.

5. The method aceording to claim 1, further comprising a step of drying the thus-obtained aqueous solution to prepare a gum arabic with enhanced emulsification ability.

6. The method according to claim 1 which comprises a step of making unheated gum arabic into an aqueous solution under temperature conditions of below 60° C.

7. The method according to claim 6, wherein the temperature conditions are within the range of from 10 to 50° C.

* * * * *